(12) United States Patent
Kitaura

(10) Patent No.: US 10,518,449 B2
(45) Date of Patent: Dec. 31, 2019

(54) MOLD CONVEYANCE TROLLEY

(71) Applicant: PASCAL ENGINEERING CORPORATION, Itami-shi, Hyogo (JP)

(72) Inventor: Ichiro Kitaura, Itami (JP)

(73) Assignee: Pascal Engineering Corporation, Hyogo (JP)

(*) Notice: Subject to any disclaimer, the term of this patent is extended or adjusted under 35 U.S.C. 154(b) by 0 days.

(21) Appl. No.: 16/098,355

(22) PCT Filed: Jul. 11, 2017

(86) PCT No.: PCT/JP2017/025252
§ 371 (c)(1),
(2) Date: Nov. 1, 2018

(87) PCT Pub. No.: WO2018/016380
PCT Pub. Date: Jan. 25, 2018

(65) Prior Publication Data
US 2019/0152102 A1   May 23, 2019

(30) Foreign Application Priority Data

Jul. 22, 2016 (JP) ................................. 2016-144023

(51) Int. Cl.
*B62B 3/02* (2006.01)
*B29C 45/17* (2006.01)
(Continued)

(52) U.S. Cl.
CPC .......... *B29C 45/1756* (2013.01); *B21D 37/04* (2013.01); *B22D 17/22* (2013.01);
(Continued)

(58) Field of Classification Search
CPC ..... B29C 45/1756; B29C 33/30; B22D 33/00; B22D 17/22; B21D 37/04; B62B 3/002; B62B 3/02; B62B 2501/02–06
See application file for complete search history.

(56) References Cited

U.S. PATENT DOCUMENTS

| | | | | |
|---|---|---|---|---|
| 9,902,416 B1* | 2/2018 | Dockery | ................... | B62B 3/10 |
| 2001/0027276 A1* | 10/2001 | Labrecque | ............... | A61D 3/00 |
| | | | | 600/551 |
| 2001/0045718 A1* | 11/2001 | Boirum | ................... | B25H 3/02 |
| | | | | 280/47.26 |

(Continued)

FOREIGN PATENT DOCUMENTS

| | | |
|---|---|---|
| JP | 2001-18231 A | 1/2001 |
| JP | 2002-1771 A | 1/2002 |

(Continued)

*Primary Examiner* — Erez Gurari
(74) *Attorney, Agent, or Firm* — Norris McLaughlin, P.A.

(57) ABSTRACT

In a mold conveyance trolley, a trolley body includes vertical first and second side plates, first and second structural frames capable of providing rigidity in vertical planes to the front portion and the rear portion of the trolley body; and a plurality of plate members intersecting the first and second structural frames; each of the first and second structural frames includes a plurality of linking members disposed at different height positions and linked to the first and second side plates, and a plurality of steel pipe members fitted over each of the plurality of linking members and have a spacer function.

7 Claims, 15 Drawing Sheets

(51) Int. Cl.
*B21D 37/04* (2006.01)
*B22D 17/22* (2006.01)
*B29C 33/30* (2006.01)
*B22D 33/00* (2006.01)

(52) U.S. Cl.
CPC .............. *B22D 33/00* (2013.01); *B29C 33/30* (2013.01); *B62B 3/02* (2013.01)

(56) References Cited

U.S. PATENT DOCUMENTS

| | | | | |
|---|---|---|---|---|
| 2004/0066012 A1* | 4/2004 | Choi | ............ | B62B 3/02 280/47.35 |
| 2006/0022419 A1* | 2/2006 | Phillips, II | ........ | B62B 3/02 280/47.35 |
| 2006/0043687 A1* | 3/2006 | Downs | .......... | B25H 1/02 280/47.34 |
| 2010/0243012 A1* | 9/2010 | Lindeman | ........ | B62B 3/02 135/88.02 |
| 2015/0225006 A1* | 8/2015 | Thiel | .......... | B62B 5/085 280/651 |
| 2016/0221593 A1* | 8/2016 | Broom | .......... | B62B 3/005 |
| 2017/0258222 A1* | 9/2017 | Jackson | ........ | F16M 13/02 |
| 2019/0071110 A1* | 3/2019 | Finstad | ........ | B62B 3/18 |
| 2019/0084601 A1* | 3/2019 | Green | ........ | B62B 3/005 |
| 2019/0111956 A1* | 4/2019 | Phillips | ........ | A47B 31/00 |
| 2019/0185038 A1* | 6/2019 | Choi | .......... | B62B 7/14 |

FOREIGN PATENT DOCUMENTS

| | | |
|---|---|---|
| JP | 2002-21972 A | 1/2002 |
| WO | 2009/090711 A1 | 7/2009 |

* cited by examiner

MOLD CONVEYANCE TROLLEY

TECHNICAL FIELD

The present invention relates to a mold conveyance trolley, and in particular relates to such a trolley with which it is possible remarkably to lighten the trolley body and to reduce the cost of production.

BACKGROUND ART

A self-propelled type mold conveyance trolley for exchanging molds of an injection molding machine has a mounting portion with two surfaces for mounting two molds (a mold before exchange and a mold after exchange) whose mutually opposing faces are oriented in the vertical direction. A roller conveyor is provided on the mounting portion, and has a conveyance surface that is capable of transferring molds of various sizes sideways.

In the mold exchange and conveyance trolley disclosed in Patent Document #1, a base frame and a mounting frame above it are linked together by parallel links, and the height position of the mounting frame can be adjusted via the parallel links by a hydraulic cylinder, with two roller conveyors being provided to the mounting frame.

Next, an example of a mold conveyance system for an injection molding machine in the prior art will be explained with reference to FIGS. 14 through 16. A mold transfer platform 110 is installed in front of a fixed side platen 100 and a movable side platen of an injection molding machine, and a mold conveyance trolley 120 is disposed in front of the mold transfer platform 110 so as to be capable of self-propulsion in the transverse direction. The mold conveyance trolley 120 comprises a trolley body 121, two pairs of wheels 122, and two roller conveyors 123. The trolley body 121 is built with two large sized type steels 121a provided respectively at its front portion and at its rear portion, which are linked together by link members 121b that extend in the front to rear direction, and with the two roller conveyors 123 being provided on the upper surface of the trolley body 121.

By contrast, a self-propelled mold conveyance trolley for a press machine has a mounting portion with one or a plurality of surfaces on which one or a plurality of molds are mounted with their departing faces held in a horizontal attitude. A plurality of roller conveyors are provided on the mounting portion.

A mold conveyance trolley for conveying a mold for a press machine is disclosed in Patent Document #2. This mold conveyance trolley comprises a plurality of wheels, a trolley body provided over these wheels, and two roller conveyors mounted on two mounting portions provided on the upper surface of the trolley body.

Next, an example of a prior art of a mold conveyance system for a press machine will be explained with reference to FIGS. 17 through 19. A mold transfer platform 210 capable of transferring a mold 201 in the front and rear direction is disposed in front of a bolster 200 of the press machine, and a mold conveyance trolley 220 is disposed in front of the mold transfer platform 210 and is capable of traveling on two rails 221. A pusher device 230 is provided in front of the mold conveyance trolley 220, and shifts two pushers 231 with a drive motor via chains and sprockets.

The mold conveyance trolley 220 comprises a trolley body 222, two pairs of wheels 223, two roller conveyors 224, and two guide rails 225 for the mold pushers. The trolley body 222 is built with two large sized type steels 222a that are provided respectively at its front portion and at its rear portion and are linked together by link members 222b that extend in the front to rear direction, and with the two roller conveyors 224 and two guide rails 225 on those type steels 222a.

PRIOR ART DOCUMENT

Patent Document

Patent Document #1: Japanese Laid Open Patent Publication 2001-18231. Patent Document #2: Japanese Laid Open Patent Publication 2002-21972.

SUMMARY OF INVENTION

Technical Problem

Since the trolley body of a mold conveyance trolley according to the prior art is built by employing several large sized type steels, accordingly this construction is uneconomical because it provides greater rigidity and greater strength than required. Moreover since, in order to mount the roller conveyors on these type steels, an attachment construction for attachment with bolts is provided including a large number of steel members such as support members and link members and so on, accordingly this entails problems such as that the weight of the trolley body also becomes great, the cost of production becomes high, and the size of the motor for self propulsion is increased.

An object of the present invention is to provide a mold conveyance trolley with which it is possible to lighten the trolley body, and to reduce the cost of production by simplifying the construction for attaching the roller conveyors to the trolley body.

Means to Solve the Problem

The mold conveyance trolley according to claim 1 comprises a trolley body and two pairs of wheels provided at the lower portion of the trolley body, and is capable of propelling itself in a first direction via the two pairs of wheels and of conveying a mold, wherein: the trolley body comprises, at both its side portions, first and second side plates disposed in vertical attitudes and oriented in a front and rear direction orthogonal to the first direction, first and second structural frames that are capable of providing rigidity in vertical planes to a front portion and a rear portion of the trolley body; and a plurality of plate members disposed in vertical attitudes and oriented in the front and rear direction, with intersecting the first and second structural frames; and wherein each of the first and second structural frames comprises a plurality of linking members that are provided parallel to the first direction and disposed at different height positions and linked to the first and second side plates, and a plurality of steel pipe members that are fitted over each of the plurality of linking members and have a spacer function of regulating the gaps between the plurality of plate members through which the linking members penetrate, and gaps between the plate members and the first and second side plates.

According to this structure, since the two first and second structural frames that are capable of imparting rigidity to the front portion and to the rear portion of the trolley body in their vertical planes connect together the first and second side plates with the plurality of linking members that are disposed parallel to the first direction and positioned at different heights, and since it is arranged to regulate the gaps between the plurality of plate members through which the linking members penetrate and the gaps between the plate members and the first and second side plates by providing the plurality of steel pipe members that are fitted over the plurality of linking members, accordingly it is possible to connect together the first and second side plates with the first and second structural frames that are of simple and lightweight construction, so that, while being able to ensure the rigidity of the front portion and the rear portion of the trolley body in their vertical planes, also it is possible to determine the positions of the plurality of plate members while connecting them together with the first and second structural frames.

Due to the above, it is possible to lighten the trolley body of the mold conveyance trolley, to simplify the structures that connect the plurality of plate members to the trolley body, and to reduce the cost of production of the mold conveyance trolley.

A first preferred aspect of the invention is characterized in that the plurality of plate members are a plurality of roller support plates that support a plurality of roller members for mold transfer. This structure makes it possible to support the plurality of roller members for mold transfer by employing the plurality of plate members A second preferred aspect of the invention is characterized by comprising a horizontal base plate that connects the lower edge portions of the first and second side plates, two pairs of wheel support members to each of which a pair of front and rear wheels are installed and that are fixed to the lower surface of the horizontal base plate, and a plurality of coupling blocks that are set up on the horizontal base plate above the two pairs of wheel support members; and each of the first and second side plates is connected to the coupling blocks via one of the linking members and the steel pipe members, and the lower edge portions of the plurality of roller support plates are attached to the horizontal base plate.

According to this structure, since the horizontal base plate that connects the lower edge portions of the first and second side plates is provided, the two pairs of wheel support members are fixed to the lower surface of the horizontal base plate, the plurality of coupling blocks are set up on the upper surface of the horizontal base plate, the lower edge portions of the plurality of roller support plates are fixed to the horizontal base plate, and each of the first and second side plates is connected to the coupling blocks via one of the linking members and the steel pipe members, accordingly, via the horizontal base plate, it is possible to ensure the unity and integrity of the first and second side plates, the two pairs of wheel support members, the plurality of coupling blocks, and the plurality of roller support plates.

A third preferred aspect of the invention is characterized in that: the first side plate, a roller support plate that opposes the first side plate with a predetermined gap therebetween, and a plurality of first roller members having lengths corresponding to the predetermined gap are constituting a first roller conveyor that is capable of transferring a mold for injection molding in the front and rear direction; and the second side plate, a roller support plate that opposes the second side plate with a predetermined gap therebetween, and a plurality of first roller members are constituting a second roller conveyor that is capable of transferring the mold for injection molding in the front and rear direction.

According to this structure, the first roller conveyor that is capable of transferring the mold for injection molding in the front and rear direction comprises the first side plate, the roller support plate, and the plurality of first roller members, and the second roller conveyor that is capable of transferring the mold for injection molding in the front and rear direction comprises the second side plate, the roller support plate, and the plurality of second roller members.

Due to the above, it is possible to realize the first and second roller conveyors with a simple construction.

A fourth preferred aspect of the invention is characterized by comprising two pairs of wheel support members between the first and second side plates, to each of which a pair of front and rear wheels are installed, and a plurality of coupling blocks that are fixed above the two pairs of wheel support members; and in that: the plurality of roller support plates comprise two pairs of roller support plates disposed in states to sandwich the coupling blocks; and each of the two pairs of roller support plates is linked to the coupling blocks via the linking member and a plurality of steel pipe members.

According to this structure, since it is possible to build the two roller conveyors by employing the two pairs of roller support plates that are in states of sandwiching the pairs of coupling blocks that are fixed to the pairs of wheel support members at the front and the rear, and the pairs of roller support plates are linked to the pair of coupling blocks via the linking members and the plurality of steel pipe members, accordingly the determination of the positions of the roller support plates is simplified, and the structure for connection of the linking members is simplified.

A fifth preferred aspect of the invention is characterized in that transfer of a mold for a press machine is enabled by two third roller conveyors, each of which comprises a plurality of second roller members fitted to the upper edge portions of a pair of roller support plates.

According to this structure, it is possible to construct the two third roller conveyors that have a simple structure by incorporating the two pairs of roller support plates and the plurality of second roller members.

A sixth preferred aspect of the invention is characterized in that each of the plurality of linking members is kept in a state in which tension is applied thereto.

According to this structure, since each of the linking members is kept in a state in which tension is applied thereto, accordingly this is beneficial for enhancing the rigidity of the first and second structural frames in their vertical planes.

Advantages of Invention

According to the present invention, advantageous effects are obtained as described above.

DESCRIPTION OF EMBODIMENTS

Embodiments of the present invention will now be explained on the basis of concrete examples.

First Embodiment

Figure 1:
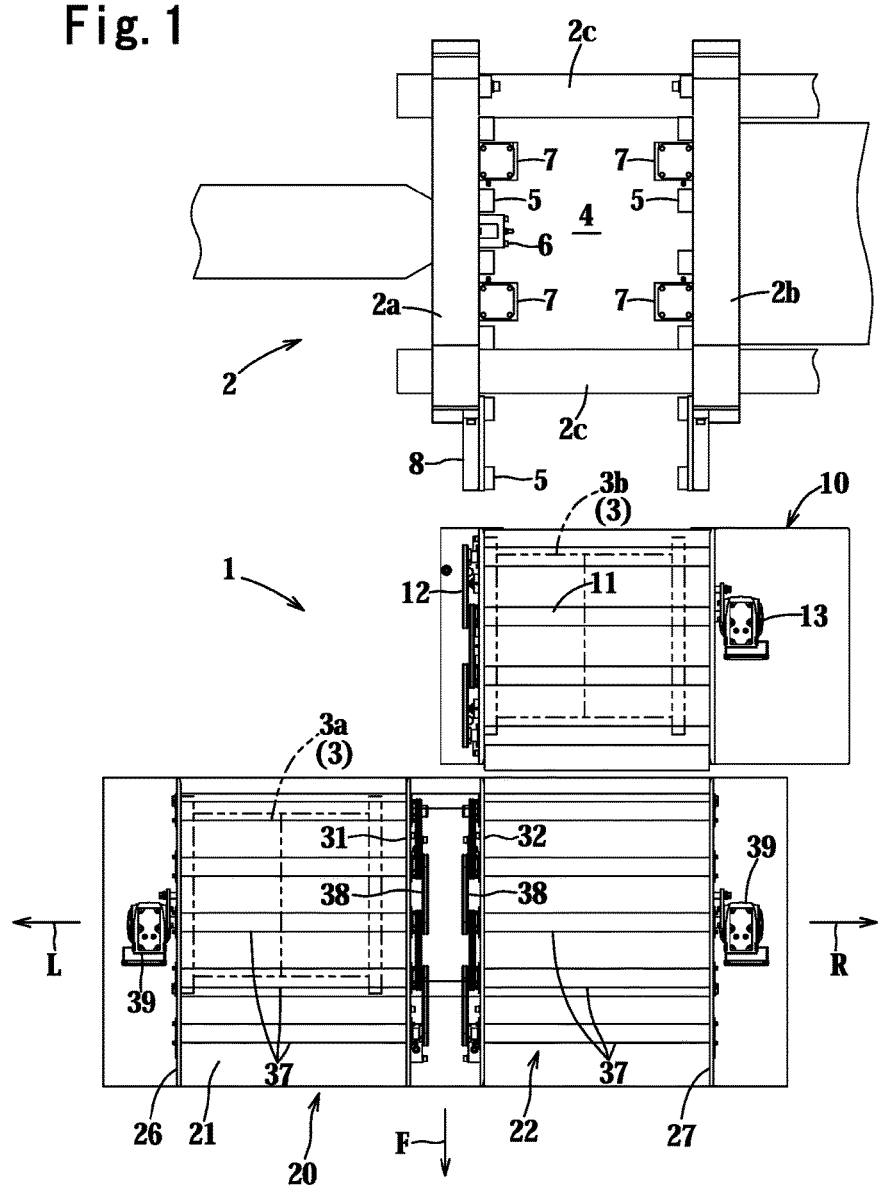
FIG. 1 is a plan view of a mold conveyance system and an injection molding machine according to a first embodiment of the present invention.
Figure 2:
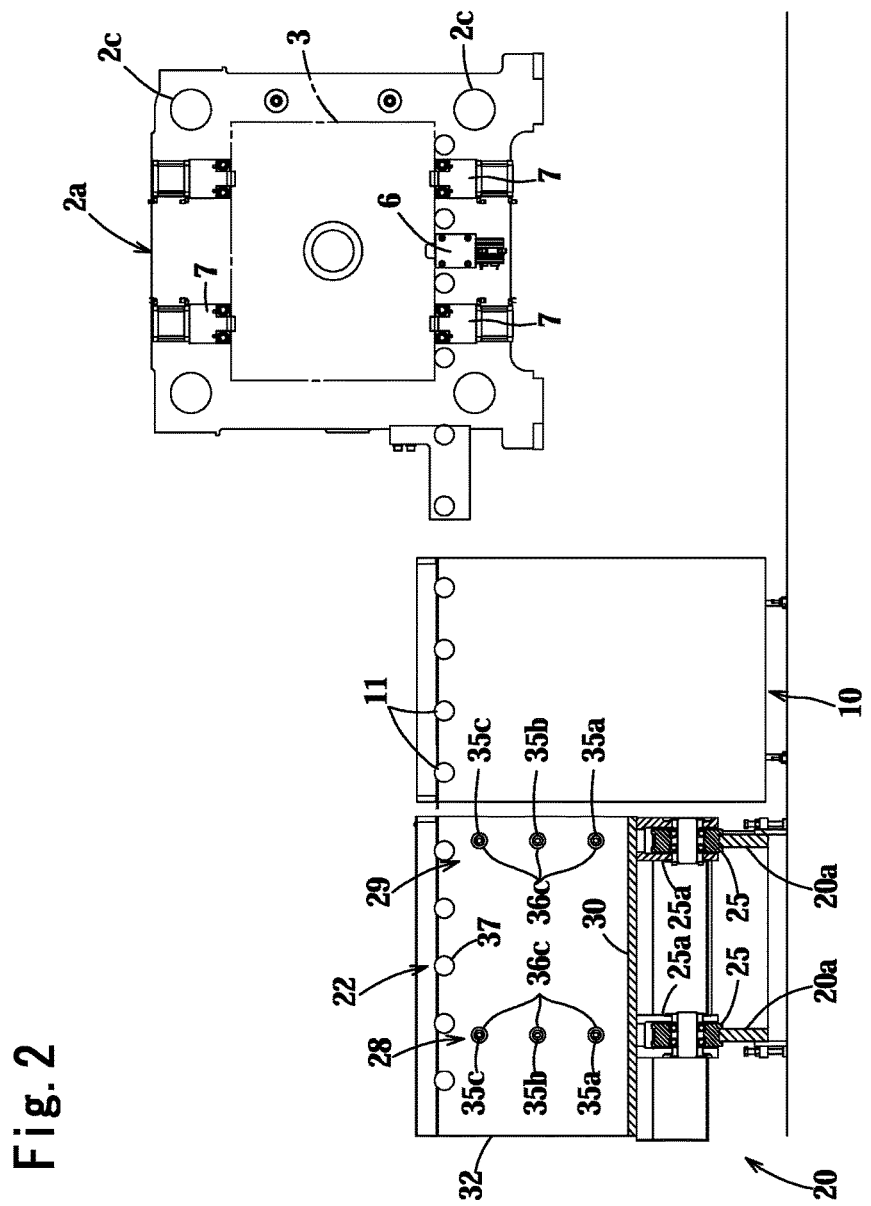
FIG. 2 is a side view of a fixed side platen and the mold conveyance system.
Figure 3:
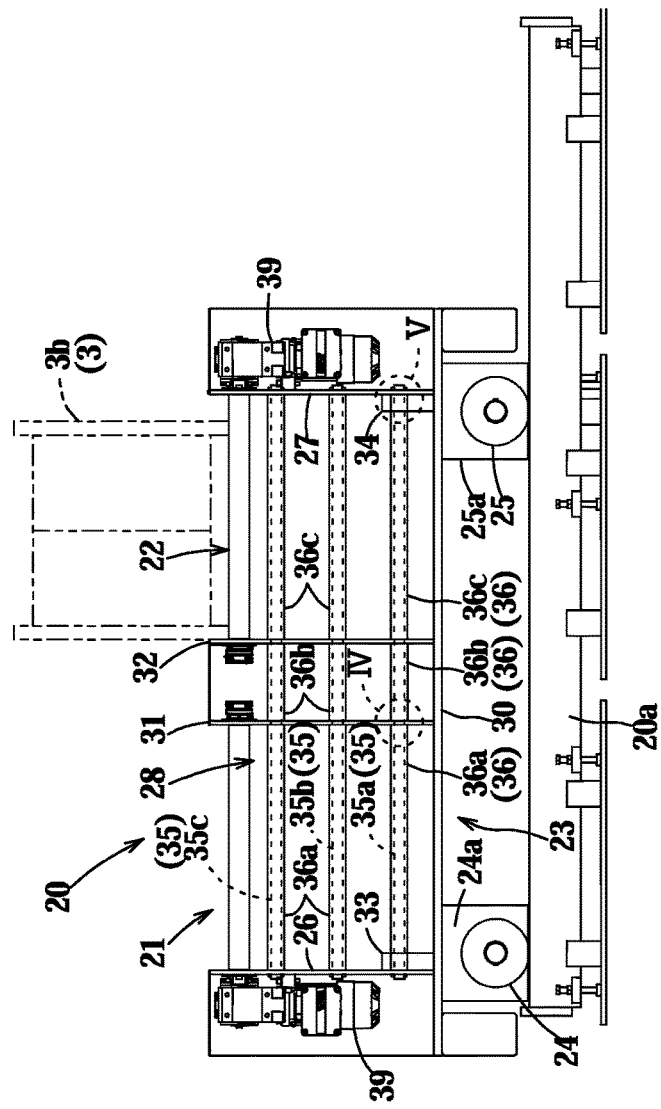
FIG. 3 is an elevation view of a mold conveyance trolley thereof.

A mold exchange system 1 and a mold conveyance trolley 20 included in the mold exchange system 1 according to the first embodiment will now be explained on the basis of FIGS. 1 through 5. In FIG. 1, the arrow L indicates the left side, the arrow R indicates the right side, and the arrow F indicates the front.

This mold exchange system 1 is a system that exchanges molds 3 (each consisting of a pair of molds separably joined together) with respect to a platen 2a on the fixed side of an injection molding machine 2 and a platen 2b on the movable side thereof. A mold transfer platform 10 is installed in front of a space 4 between the platens 2a, 2b, and the mold conveyance trolley 20 is installed at the front side of the mold transfer platform 10.

On a plate surface of the fixed side platen 2a, there are provided a plurality of idler rollers 5 for receiving and supporting the lower end of the mold 3 so that it can be transferred, a centering jig 6 that centers the mold 3, and four clamp devices 7 that clamp the mold 3 to the plate surface. And, on a plate surface of the movable side platen 2b, there are provided a plurality of idler rollers 5 for receiving and supporting the lower end of the mold 3 so that it can be transferred, and four clamp devices 7 that clamp the mold 3 to the plate surface. The reference symbol 2c indicates a tie bar.

L shaped members 8 are fixed to the front sides of the fixed side platen 20a and the movable side platen 2b, and two idler rollers 5 are provided to these L shaped members 8 for transferring the mold.

A mold transfer platform 10 is fixed in a predetermined position, with four roller members 11 extending in the transverse direction being provided to the upper surface portion of the mold transfer platform 10, and four sprockets that are attached to the left end shaft portions of these roller members 11 are linked by three endless chains 12 so as to turn together, with a right end portion of one of the roller members 11 being linked to a drive motor 11 so as to be operated thereby; and thereby the four roller members 11 can be driven to rotate forward or backward by the drive motor 13, so that it becomes possible to transfer the mold 3 forward or backward.

Next, the mold conveyance trolley 20 will be explained.

A first roller conveyor 21 on which a mold 3a before exchange is mounted is provided on the left half portion of an upper surface portion of the mold conveyance trolley 20, and a second roller conveyor 22 on which a mold 3b after exchange is mounted is provided on its right half portion. This mold conveyance trolley 20 comprises a trolley body 23 that is elongated in the transverse direction (left and right direction, i.e. a "first direction"), and two pairs of wheels 24, 25 that are provided to the lower side of the trolley body 23 and that convey it on a pair of front and rear rails 20a extending in the transverse direction. The pair of wheels 24 are drive wheels, and are driven by a drive motor not shown in the figures.

The trolley body 23 comprises first and second side plates 26, 27 in vertical attitudes at both its sides that are provided so as to be oriented in the front and rear direction (longitudinal direction which is orthogonal to the transverse direction), first and second structural frames 28, 29 that are provided at the front and rear portions of the trolley body 23 in vertical planes parallel to the first direction and that enhance the rigidity of the trolley body 23 in these vertical planes, and a horizontal base plate 30 that connects together the lower edge portions of the first and second side plates 26, 27. Here, the lower edge portions of the first and second side plates 26, 27 are fixed to the upper surface of the horizontal base plate 30.

A pair of left and right plate members 31, 32 are provided at sites on the trolley body 23 intermediate in the transverse direction, and are arranged so as to be oriented in a vertical attitude in the front and rear direction, with their front portions intersecting the first structural frame 28 and their rear portions intersecting the second structural frame 29. The left side plate member 31 is disposed in a position that corresponds to the right side portion of the first roller conveyor 21, and the right side plate member 32 is disposed in a position that corresponds to the left side portion of the second roller conveyor 22. The plate members 31, 32 are generally shaped as rectangles, and their longitudinal widths and their vertical widths are almost the same as the longitudinal width and the vertical width of the trolley body 23.

A pair of wheel support members 24a that support the pair of front and rear wheels 24 on the left side are adhered to the lower surface of the horizontal base plate 30 below the first side plate 26, and a pair of front and rear coupling blocks 33 are set up on the horizontal base plate 30 above the left side pair of wheel support members 24a, with the pair of coupling blocks 33 being contacted against the right side surface of the first side plate 26. It would also be acceptable for the pair of front and rear coupling blocks 33 to be one continuous longitudinal member.

Moreover, a pair of wheel support members 25a that support the pair of front and rear wheels 25 on the right side are adhered to the lower surface of the horizontal base plate 30 below the second side plate 27, and a pair of front and rear coupling blocks 34 are set up on the horizontal base plate 30 above the pair of wheel support members 25a, and are contacted against the left side surface of the second side plate 27. It would also be acceptable for the pair of front and rear coupling blocks 34 to be one continuous longitudinal member.

The first structural frame 28 comprises, at the front portion of the trolley body 23, a plurality (for example, three) of linking members 35a, 35b, and 35c (these will be referred to as "linking members 35") that are disposed parallel to the transverse direction and lying within a single vertical plane that is parallel to the first direction, and that moreover are positioned at different heights therein (in a lower part, in an intermediate part, and in an upper part thereof), and that link together the first and second side plates 26, 27, and a plurality of steel pipe members 36 fitted over each of these plurality of linking members 35 that have a spacer function of regulating the gaps between the plurality of plate members 31, 32 through which the linking members 35 pass and the gaps between the plate members 31, 32 and the first and second side plates 26, 27.

The linking member 35a in the lower part of the first structural frame 28 penetrates through the first side plate 26, the coupling block 33 at the right side thereof, the plate members 31, 32, the coupling block 34 at the left side of the second side plate 27, and the second side plate 27. Over the linking member 35a, there are fitted: a steel pipe member 36a that regulates the gap between the first side plate 26 and the plate member 31; a steel pipe member 36b that regulates the gap between the plate members 31, 32; and a steel pipe member 36c that regulates the gap between the plate member 32 and the second side plate 27. These steel pipe members 36a through 36c will be referred to as the "steel pipe members 36".

Figure 4:
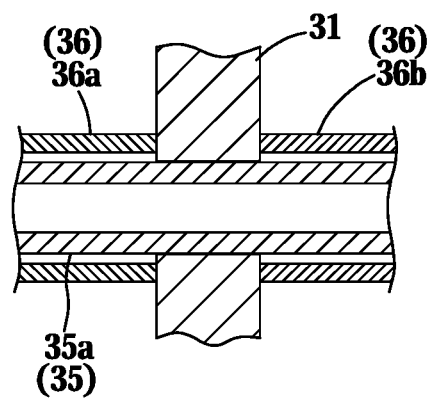
FIG. 4 is an enlarged sectional view of a portion IV of FIG. 3.

As shown in FIG. 4, at the location where the linking member 35a penetrates through the plate member 31, the end portions of two of the steel pipe members 36 are contacted against the left and right sides of the plate member 31. The structure at the location where the linking member 35a penetrates through the plate member 32 is also similar to that described above.

Figure 5:
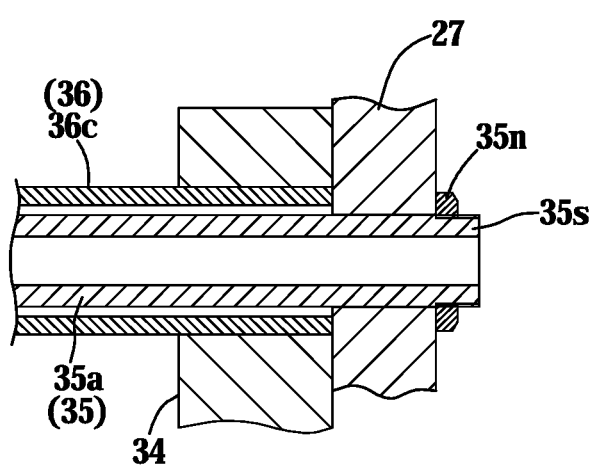
FIG. 5 is an enlarged sectional view of a portion V of FIG. 3.

As shown in FIG. 5, at the right end portion of the linking member 35a, the end portion of one of the steel pipe members 36 is contacted against the inner side of the second side plate 27, with a male screw portion 35s being formed at the right end portion of the linking member 35a and projecting out from the outer side of the second side plate 27, and with a nut 35n being screwed onto the male screw portion 35s. The structure at the location where the left end portion of the linking member 35a penetrates through the first side plate 26 is also similar to that described above.

A predetermined tension is applied to the linking member 35a by strongly screwing the nuts 35n on both end portions of the linking member 35a, and this tension is maintained due to the provision of the plurality of steel pipe members 36a through 36c.

The linking member 35b at the intermediate part of the first structural frame 28 penetrates through the first side plate 26, the plate members 31, 32, and the second side plate 27. In a similar manner to the case with the linking member 35a in the lower part, a plurality of steel pipe members 36a through 36c are fitted over the linking member 35b, and nuts 35n are screwed on to both end portions of the linking member 35b, so that tension is applied to the linking member 35b.

Moreover, the linking member 35c at the upper part of the first structural frame 28 penetrates through the first side plate 26, the plate members 31, 32, and the second side plate 27. In a similar manner to the case with the linking member 35a, a plurality of steel pipe members 36a through 36c are fitted over the linking member 35c, and nuts 35n are screwed on to both end portions of the linking member 35c, so that tension is applied to the linking member 35c.

At the rear portion of the trolley body 23, the second structural frame 29 comprises a plurality (for example, three) of linking members 35a, 35b, and 35c that are disposed parallel to the transverse direction within a single vertical plane that is parallel to the first direction and that moreover are positioned at different height positions therein (in a lower part, in an intermediate part, and in an upper part thereof), and that link together the first and second side plates 26, 27, and a plurality of steel pipe members 36a through 36c that are fitted over each of the plurality of linking members 35a through 35c and that have a spacer function of regulating the gaps between the plurality of plate members 31, 32 through which the linking members 35 pass and the gaps between the plate members 31, 32 and the first and second side plates 26, 27. Since the second structural frame 29 has a similar construction to that of the first structural frame 28, accordingly similar reference symbols are appended to similar members thereof, and explanation will be omitted.

Next, the first and second roller conveyors 21, 22 will be explained. In the first roller conveyor 21, a plurality (for example, five) of roller members 37 that are oriented in the transverse direction and have predetermined lengths straddle between the upper edge portion of the first side plate 26 and the upper edge portion of the plate member 31, and sprockets on the right shaft end portions of the plurality of roller members 37 at the right side of the plate member 31 are linked by four endless chains 38 so as to operate together, while a drive motor 39 attached to the left side surface of the first side plate 26 is linked to one of the roller members 37 so that they operate together, whereby, by driving the drive motor 39 forward or in reverse, it becomes possible to transfer a mold 3 forward or rearward with the first roller conveyor 21.

Since the second roller conveyor 22 has a structure that is almost symmetrical to that of the first roller conveyor 21 left to right, accordingly similar reference numerals are appended to similar members thereof and explanation will be omitted. The plate members 31, 32 are equivalent to roller support plates that support the plurality of roller members 37, and the first and second side plates 26, 27 also are equivalent to roller support plates that support the plurality of roller members 37.

Next, the operation of the mold exchange system 1 and the mold conveyance trolley 20 and the advantageous effects thereof will be explained. When the mold 3 is to be exchanged: with a fixed side mold and a movable side mold being integrally fixed together in a mated state, the fixing by the clamp devices 7 is released; the movable side platen 2b is shifted by just a few millimeters to the right so that a convex engagement portion at the center portion of the mold 3 is brought to the state of being removed out of a concave engagement portion at the center portion of the fixed side platen 2a; the lower edges of the mold blocks at both left and right sides of the mold 3 are supported on the idler rollers 5 of the fixed side platen 2a and the movable side platen 2b; and the mold 3b after exchange is transferred onto the mold transfer platform 10 and is then transferred onto the second roller conveyor 22 of the mold conveyance trolley 20.

Next: the mold conveyance trolley 20 is controlled to propel itself rightward by a predetermined distance so that the first roller conveyor 21 is brought to correspond to the mold transfer platform 10; the mold 3a before exchange, which is on the first roller conveyor 21, is transferred onto the mold transfer platform 10; the mold 3a is transferred onto the idler rollers 5 of the fixed side platen 2a and the movable side platen 2b; after the mold 3a has been shifted to the space 4 between the platens, the movable side platen 2b is returned to its mated position; and, after the convex engagement portion at the center portion of the mold 3a has been engaged into the concave engagement portion at the center portion of the fixed side platen 2a, the mold 3a is fixed to the fixed side platen 2a and the movable side platen 2b by the clamp devices 7.

Since, according to this mold conveyance trolley 20, each of the first and second structural frames 28, 29 at the front portion and at the rear portion of the trolley body 23 that is capable of exhibiting rigidity in a vertical plane and that connects together the first and second side plates 26, 27 has the plurality of linking members 35 that are parallel to the first direction (i.e. the transverse direction) and that are disposed at different height positions, and since it is arranged to regulate the gaps between the plurality of plate members 31, 32 through which the linking members 35 penetrate and also the gaps between the plate members 31, 32 and the first and second side plates 26, 27 with the plurality of steel pipe members 36 that are fitted over each of the plurality of linking members 36, accordingly the first and second side plates 26, 27 are linked together by the first and second structural frames 28, 29 which are simple in construction and light in weight, and thus it is possible to ensure the rigidity of the front portion and the rear portion of the trolley body 23 in a vertical plane, and also it is possible to link together and support the first and second structural frames 28, 29 while fixing the positions of the plurality of plate members 31, 32.

For the above reasons, due to the provision of the first and second structural frames 28, 29, it is possible to lighten the trolley body 23 of the mold conveyance trolley 20, to simplify the structure that connects the plurality of plate members 31, 32 to the trolley body 23, and to reduce the cost of production of the mold conveyance trolley 20.

And, since tension is applied to the three linking members 35 of the first and second structural frames 28, 29, accordingly, along with it being possible to enhance the strength and the rigidity of the connection of the linking members 35, the steel pipe members 36, the first and second side plates 26, 27, and the pair of plate members 31, 32, also it is possible further to enhance the rigidity of the front portion and the rear portion of the trolley body 23 in the vertical direction.

Since the plurality of plate members 31, 32 and the first and second side plates 26, 27 constitute a plurality of roller support plates that support the plurality of roller members 37 for mold transfer, accordingly it is possible to support the plurality of roller members 37 for mold transfer by employing the plate members 31, 32 and the first and second side plates 26, 27.

Moreover, since the horizontal base plate 30 is provided that connects together the lower edge portions of the first and second side plates 26, 27, the two pairs of wheel support members 24a, 25a are fixed to the lower surface of the horizontal base plate 30, the plurality of coupling blocks 33, 34 are erected on the upper surface of the horizontal base plate 30, the lower edge portions of the plurality of roller support plates 26, 27, 31, and 32 are attached to the horizontal base plate 30, and each of the first and second side plates 26, 27 is linked to the coupling blocks 33, 34 via the linking members 35 and the steel pipe members 36, accordingly it is possible, via the horizontal base plate 30, to ensure the unity and integrity of the first and second side plates 26, 27, of the two pairs of wheel support members 24a, 25a, of the plurality of coupling blocks 33, 34, and of the plurality of roller support plates 31, 32.

And it is possible to provide the first and second roller conveyors 21, 22 with a simple construction, since the first roller conveyor 21 which is capable of transferring the mold 3 in the front anad rear direction is built to incorporate the first side plate 26, the plate member 31, and the plurality of first roller members 37, and the second roller conveyor 22 which is capable of transferring the mold 3 in the front and rear direction is built to incorporate the second side plate 27, the plate member 32, and the plurality of second roller members 37.

Second Embodiment

Figure 6:
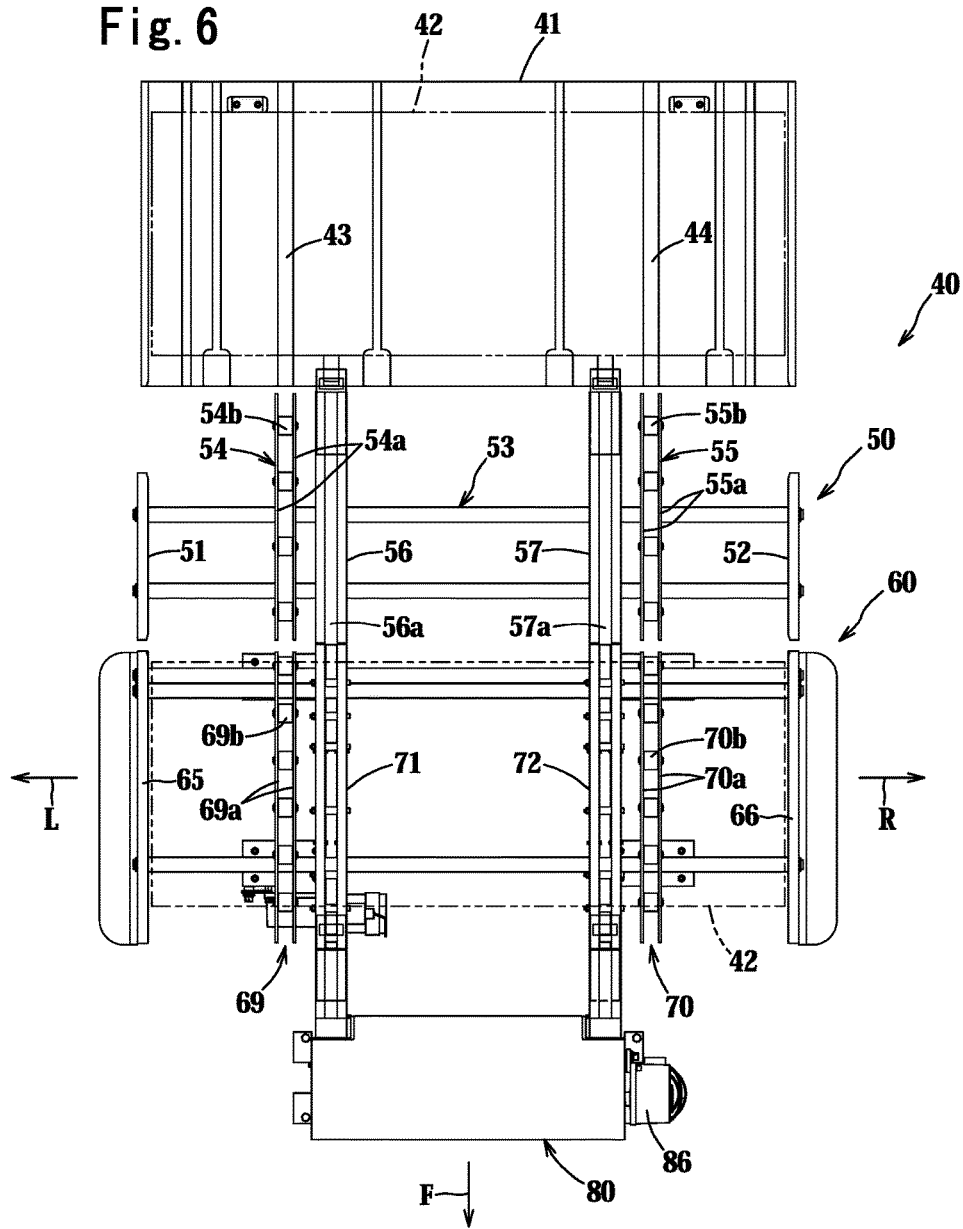
FIG. 6 is a plan view of a bolster of a press machine and a mold conveyance system according to a second embodiment.

A mold exchange system 40 and a mold conveyance trolley 60 included in the mold exchange system 40 according to the second embodiment will now be explained with reference to FIGS. 6 through 13. In FIG. 6, the arrow L indicates the left side, the arrow R indicates the right side, and the arrow F indicates the front.

This mold exchange system 40 is a system that exchanges a die 42 with respect to a bolster 41 of a press machine. A mold transfer platform 50 is installed in front of the bolster 41, and the mold conveyance trolley 60 is installed in front of the mold transfer platform 50.

The mold transfer platform 50 comprises a base frame 53 that has first and second side plates 51, 52 at its left and right side portions, two roller conveyors 54, 55 that are provided on an upper surface portion of the base frame 53 and that are oriented in the front and rear direction, a guide rail 56 that is disposed in the neighborhood of the right side of the left side roller conveyor 54, and a guide rail 57 that is disposed in the neighborhood of the left side of the right side roller conveyor 55; and the mold transfer platform 50 is fixed on a floor surface.

Since each of the two roller conveyors 54, 55 supports a plurality of short cylindrical roller members 54b, 55b between a respective pair of ribbon plates 54a, 55a so that they can rotate freely, accordingly the two roller conveyors 54, 55 are adapted to be capable of transferring the die 42 in the front and rear direction. The guide rails 56, 57 are provided in order to define T grooves 56a, 57a for guiding a pusher carriage 84 which will be described later. Moreover, two groove portions 43, 44 that extend in the front and rear direction are formed in the bolster 41 at positions corresponding to the two roller conveyors 54, 55, and die lifters (not shown in the figures) are provided in these groove portions 43, 44 so as to match the roller conveyors 54, 55 and can freely protrude from and retract into the upper surface of the bolster 41.

The mold conveyance trolley 60 comprises a trolley body 61 and two pairs of wheels 62,63 that are provided at the bottom of the trolley body 61, and is adapted to be capable of propelling itself on the two pairs of wheels 62, 63 in the transverse direction (i.e. in a first direction) along a pair of front and rear rails 64.

The trolley body 61 comprises first and second side plates 65, 66 at its two side portions that are disposed in vertical attitudes and that are oriented in the front and rear direction so as to extend orthogonally to the first direction, and first and second structural frames 67, 68 in vertical planes parallel to the first direction that are capable of providing rigidity in vertical planes to the front portion and the rear portion of the trolley body 61.

Two roller conveyors 69, 70 (which correspond to the third roller conveyors) that respectively correspond to the two roller conveyors 54, 55 of the mold transfer platform 50, and two guide rails 71, 72 that respectively correspond to the two guide rails 56, 57, are provided on the top portion of the trolley body 61. The roller conveyors 69, 70 are similar to the roller conveyors 54, 55, and each comprises a plurality of respective roller members 69b, 70b (which correspond to the second roller members) that are installed so as to rotate freely, with their axes extending in the transverse direction between the upper edge portions of a respective pair of roller support plates 69a, 70a (which correspond to the plate members) that oppose one another on left and right with a predetermined gap between them. These two roller conveyors 69, 70 are capable of shifting the die 42 in the front and rear direction.

The left side roller conveyor 69 is disposed at positions corresponding to the pair of front and rear wheels 62, the lower edge portions of its pair of roller support plates 69a are fixed to a pair of coupling blocks 73 that are set up on the pair of front and rear wheel support members 62a. The pair of coupling blocks 73 may also be one continuous member.

And, the right side roller conveyor 70 is disposed at positions corresponding to the pair of front and rear wheels 63, the lower edge portions of its pair of roller support plates 70a are fixed to a pair of coupling blocks 74 that are set up on the pair of front and rear wheel support members 63a. The pair of coupling blocks 74 may also be one continuous member.

The first structural frame 67 penetrates through (i.e. intersects) the front portions of the two pairs of roller support plates 69a, 70a, and the second structural frame 68 penetrates through (i.e. intersects) the rear portions of the two pairs of roller support plates 69a, 70a. At the front portions of the roller support plates 69a, 70a, the abovementioned predetermined gap between the roller support plates is regulated by the first structural portion 67 as will be described hereinafter; at the rear portions of the roller support plates 69a, 70a, the abovementioned predetermined gap between the roller support plates is regulated by the second structural frame 68 as will be described hereinafter; and, at the upper parts of the two pairs of roller support plates 69a, 70a, the abovementioned predetermined gap between the roller support plates is regulated by a plurality of bolts and spacers (not shown in the figure).

At the front portion of the trolley body 61, the first structural frame 67 comprises a plurality (for example, three) of linking members 75a, 75b, 75c that are disposed parallel to the transverse direction (i.e. the first direction) within a single vertical plane and that moreover are positioned at different height positions therein (in a lower part, in an intermediate part, and in an upper part thereof), and that connect the first and second side plates 65, 66 together, and a plurality of steel pipe members 76 that are fitted over each of the plurality of linking members 75a, 75b, 75c and through all of which the linking members 75a, 75b, 75c pass, and that moreover have the function of acting as spacers that regulate the gaps between the plurality of roller support plates 69a, 69a and 70a, 70a and the gaps between the roller support plates 69a, 70a and the first and second side plates 65, 66. The linking members 75a, 75b, 75c are referred to as "linking members 75".

The linking member 75a in the lower part of the first structural frame 67 passes through the first side plate 65, the pair of roller support plates 69a, the coupling block 73 that is sandwiched between the pair of roller support plates 69a, the pair of roller support plates 70a, the coupling block 74 that is sandwiched between the pair of roller support plates 70a, and the second side plate 66.

A steel pipe member 76a that regulates the gap between the first side plate 65 and the roller support plate 69a, a steel pipe member 76b that regulates the gap between the roller support plates 69a, 70a, and a steel pipe member 76c that regulates the gap between the roller support plate 70a and the second side plate 66 are fitted over the linking member 75a. It should be understood that the steel pipe members 76a, 76b, 76c are referred to as "steel pipe members 76".

Figure 9:
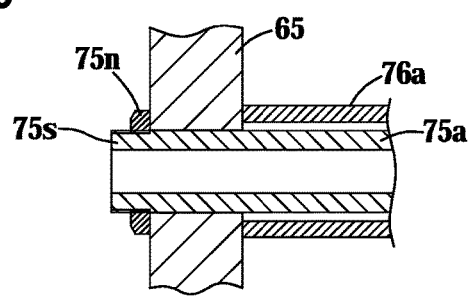
FIG. 9 is an enlarged sectional view of a portion IX of FIG. 8.

As shown in FIG. 9, at the location where the linking member 75a passes through the first side plate 65, the end portion of the steel pipe member 76a contacts against the inner side of the first side plate 65, and a male screw portion 75s is formed on the end portion of the linking member 75a and projects to the outer side of the first side plate 65, with a nut 75n being screwed on to the male screw portion 75s. The construction at the location where the linking member 75a passes through the second side plate 66 is also similar to that described above. A predetermined tension is applied to the linking member 75a by strongly screwing the nuts 75n on both end portions of the linking member 75a, and this tension is maintained due to the provision of the plurality of steel pipe members 76 and the two coupling blocks 73, 74.

Figure 10:
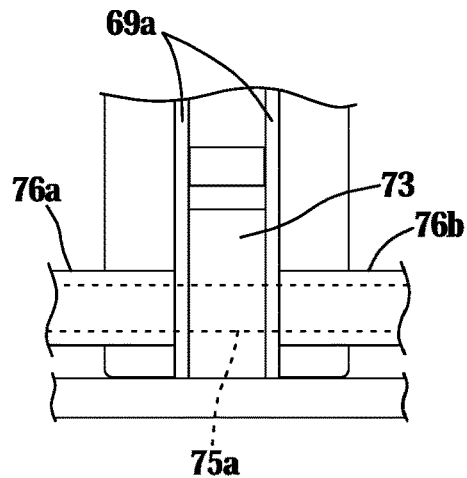
FIG. 10 is an enlarged sectional view of a portion X of FIG. 8.

As shown in FIG. 10, at the locations where the linking member 75a passes through the pair of roller support plates 69a and the coupling block 73, the end portions of the steel pipe members 76a, 76b are solidly contacted against the outer sides of the pair of roller support plates 69a, and the both end portions of the coupling block 73 are contacted against the inner sides of the pair of roller support plates 69a.

The linking member 75b at the intermediate part of the first structural frame 67 penetrates through the first side plate 65, the pair of roller support plates 69a, the pair of roller support plates 70a, and the second side plate 66.

A steel pipe member 76a that regulates the gap between the first side plate 65 and one of the roller support plates 69a, a steel pipe member 76d that regulates the gap between the pair of roller support plates 69a, a steel pipe member 76b that regulates the gap between one of the roller support plates 69a and one of the roller support plates 70a, a steel pipe member 76e that regulates the gap between the pair of roller support plates 70a, and a steel pipe member 76c that regulates the gap between one of the roller support plates 70a and the second side plate 66, are fitted over this linking member 75b.

Figure 11:
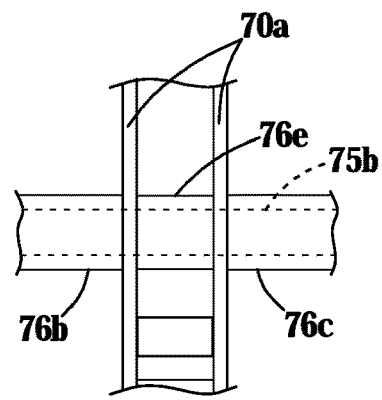
FIG. 11 is an enlarged sectional view of a portion XI of FIG. 8.

As shown in FIG. 11, at the location where the linking member 75b passes through the pair of roller support plates 70a, the end portion of the steel pipe member 76b contacts against the left side surface of the roller support plate 70a, the two ends of the steel pipe member 76e contact against the inner sides of the pair of roller support plates 70a, and the end portion of the steel pipe member 76c contacts against the right side surface of the roller support plate 70a. The other structures relating to the linking member 75b and the plurality of steel pipe members 76 are similar to those of the linking member 75a and the plurality of steel pipe members 76 in the lower part.

The linking member 75c at the upper part of the first structural frame 67 penetrates through the first side plate 65, the pair of roller support plates 69a, the pair of guide rails 71 and the pair of guide rails 72, the pair of roller support plates 70a, and the second side plate 66.

Figure 12:
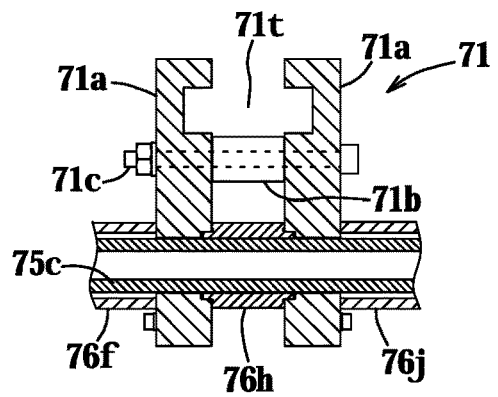
FIG. 12 is an enlarged sectional view of a portion XII of FIG. 8.

As shown in FIG. 12, in the guide rail 71, a pair of thick side boards 71a that extend in vertical attitudes in the front and rear direction oppose one another on the left and right sides with the gap between them being regulated by a plurality of spacers 71*b*, and, along with the boards being linked together by a plurality of bolts 71*c* that pass through the plurality of spacers 71*b*, also the gap between the pair of thick side boards 71*a* is further regulated by steel pipe members 76*h* fitted over the linking members 75*c*. An inverted T shaped T groove 71*t* is defined at the upper parts of the pair of thick side boards 71*a* via the plurality of spacers 71*b*, and a pusher carriage 84 which will be described hereinafter is adapted to be capable of being shifted along this T groove 71*t*.

Over the linking member 75*c* described above, there are fitted: the steel pipe member 76*a* that regulates the gap between the first side plate 65 and one of the roller support plates 69*a*; the steel pipe member 76*d* that regulates the gap between the pair of roller support plates 69*a*; the steel pipe member 76*f* that regulates the gap between one of the roller support plates 69*a* and the guide rail 71; the steel pipe member 76*h* within the guide rail 71; the steel pipe member 76*j* that regulates the gap between the guide rails 71, 72; the steel pipe member 76*i* within the guide rail 72; the steel pipe member 76*g* that regulates the gap between the guide rail 72 and one of the roller support plates 70*a*; the steel pipe member 76*e* that regulates the gap between the pair of roller support plates 70*a*; and the steel pipe member 76*c* that regulates the gap between one of the roller support plates 70*a* and the second side plate 66. The other structures relating to the linking member 75*c* and the plurality of steel pipe members 76 are similar to those of the linking member 75*a* and the plurality of steel pipe members 76 in the lower part.

At the rear portion of the trolley body 61, the second structural frame 68 comprises a plurality (for example, three) of linking members 75*a*, 75*b*, 75*c* that are disposed parallel to the transverse direction (i.e. the first direction) within a vertical region that is approximately a vertical plane and that moreover are positioned at different height positions therein (in a lower part, in an intermediate part, and in an upper part thereof), and that connect the first and second side plates 65, 66 together, and a plurality of steel pipe members 76 that are fitted over each of this plurality of linking members 75*a*, 75*b*, 75*c* and that have the function of acting as spacers that regulate the gaps between the plurality of roller support plates 69*a*, 70*a* and the gaps between the roller support plates 69*a*, 70*a* and the first and second side plates 66, 67, through all of which the linking members 75 pass. Since the second structural frame 68 has a construction similar to that of the first structural frame 67, accordingly similar reference symbols are appended to similar members thereof, and explanation thereof will be omitted.

As described above, due to the provision of the first and second structural frames 67, 68, it becomes possible to lighten the trolley body 61 of the mold conveyance trolley 60, to simplify the construction for linking the plurality of roller support plates 69*a*, 70*a* and the guide rails 71, 72 to the trolley body 61, and to reduce the cost of production of the mold conveyance trolley 60.

And, since tension is applied to the three linking members 75*a*, 75*b*, 75*c*, along with it being possible to enhance the strength and the rigidity of the linking between the linking members 75 and the steel pipe members 76, the first and second side plates 65, 66, the two pairs of roller support plates 69*a*, 70*a*, and the pair of guide rails 56, 57, also it is possible to enhance the rigidity of the front portion of the trolley body 61 in a vertical plane.

Next, the pusher device 80 will be explained that transfers the die 42 from resting on the mold conveyance trolley 60 to resting on the bolster 41 via the mold transfer platform 50, and that transfers the die 42 from resting on the bolster 41 to resting on the mold conveyance trolley 60 via the mold transfer platform 50.

Figure 7:
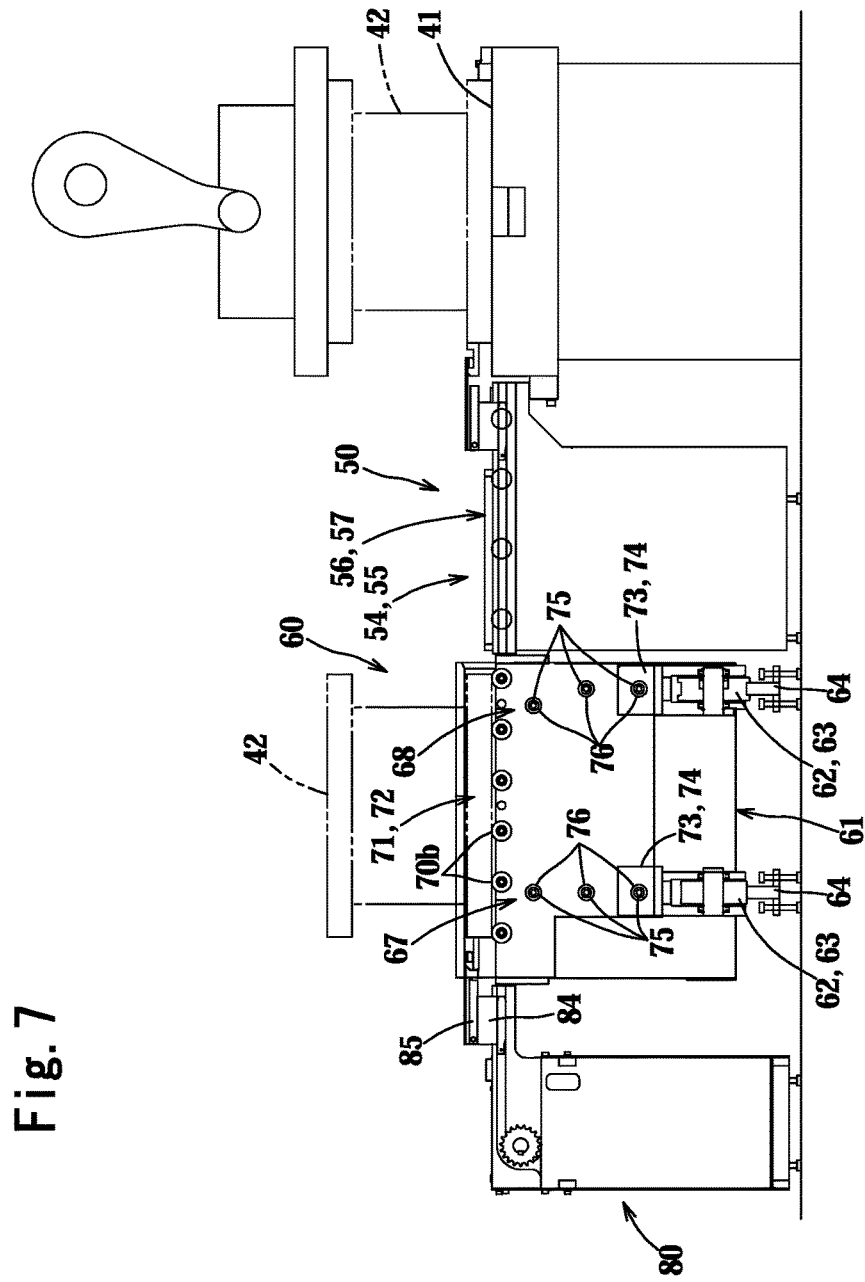
FIG. 7 is a side view of the bolster of the press machine and the mold conveyance system.
Figure 8:
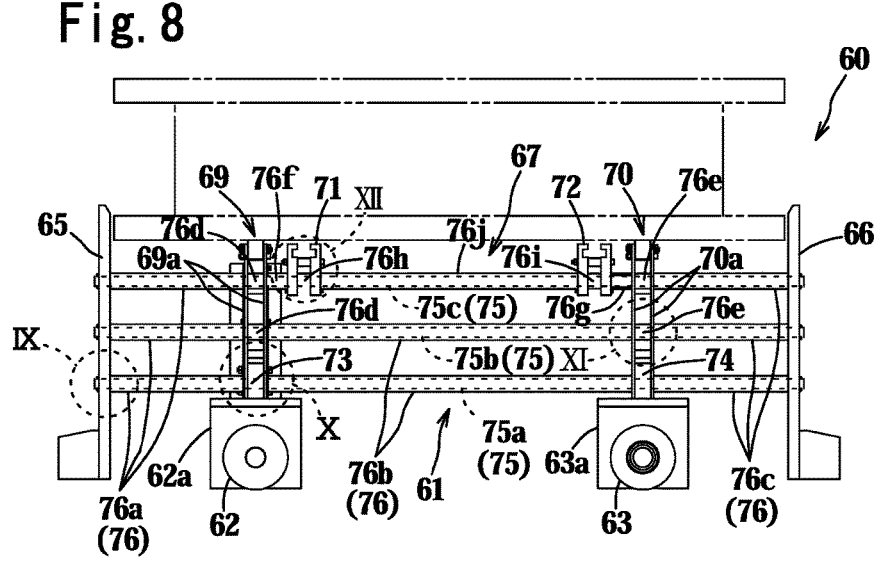
FIG. 8 is an elevation view of a mold conveyance trolley thereof.
Figure 13:
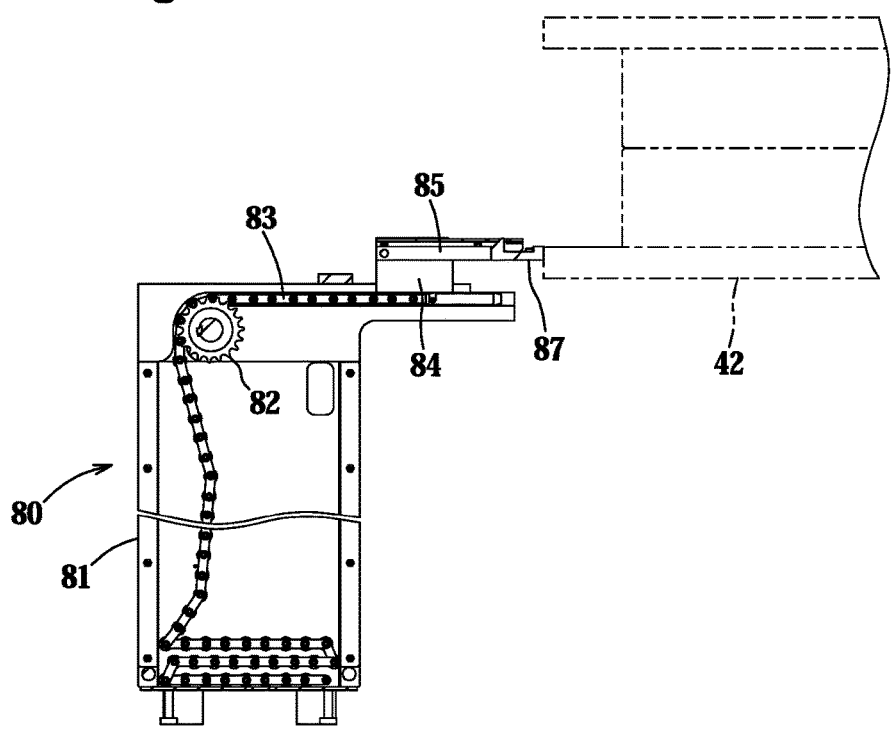
FIG. 13 is a vertical sectional side view of a pusher device.
Figure 14:
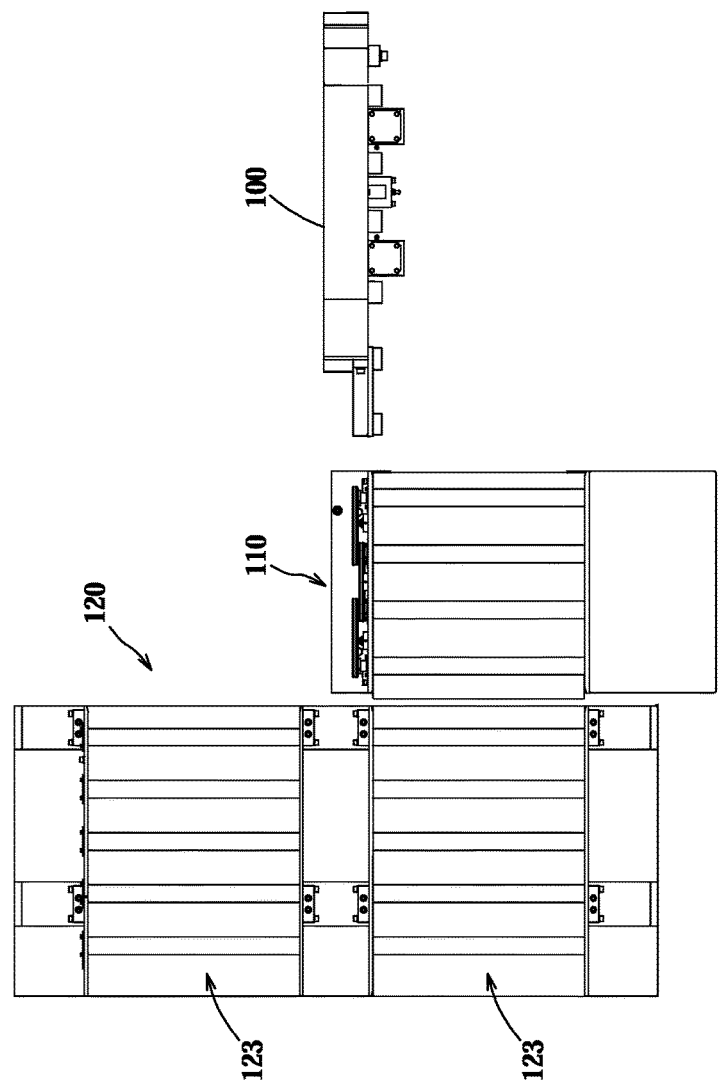
FIG. 14 is a plan view of a fixed side platen of an injection molding machine and a mold conveyance system according to the prior art.
Figure 15:
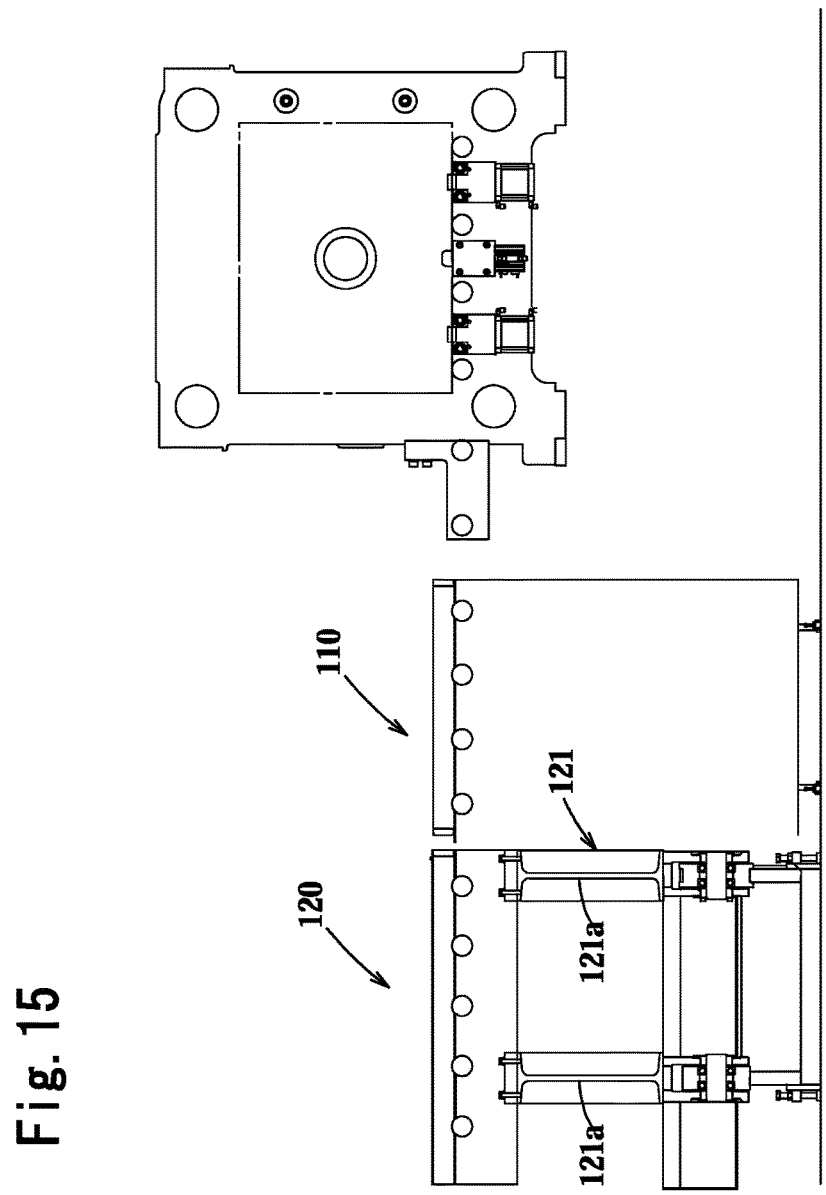
FIG. 15 is a side view of a mold conveyance trolley thereof.
Figure 16:
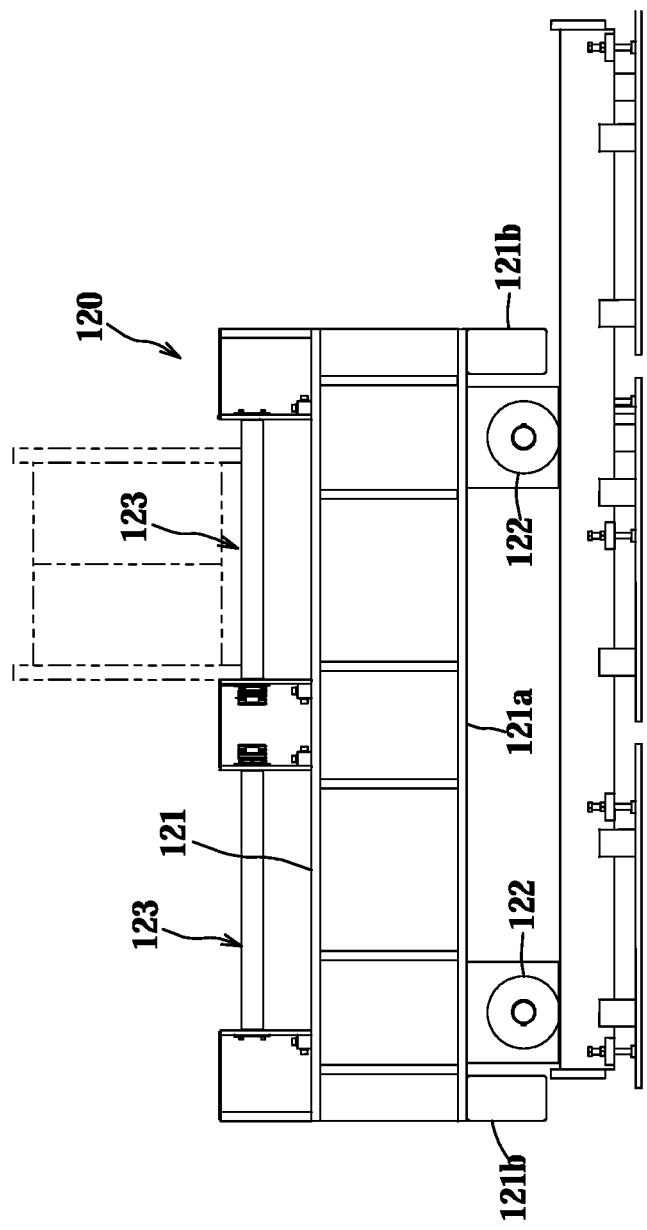
FIG. 16 is an elevation view of the mold conveyance trolley.
Figure 17:
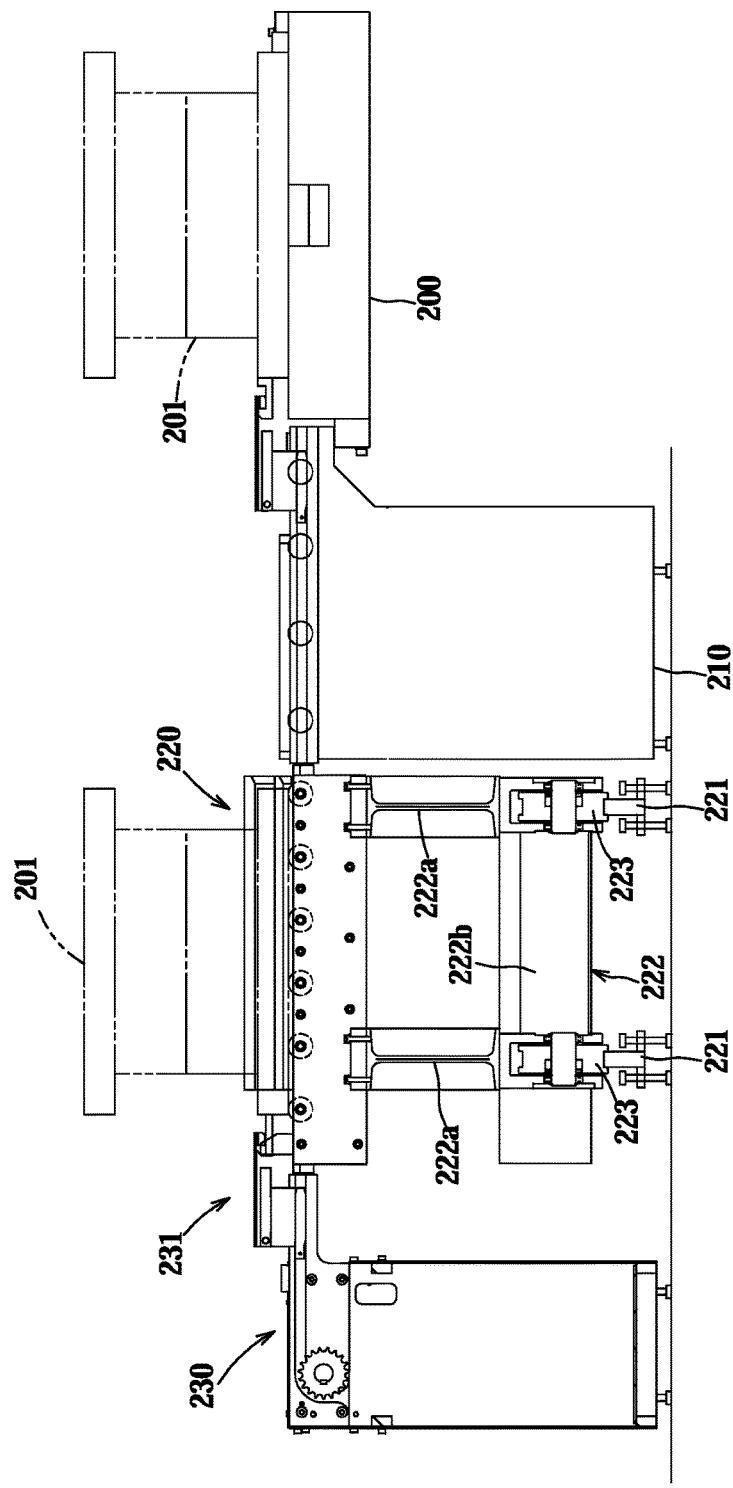
FIG. 17 is a side view of a bolster of a press machine and a mold conveyance system according to the prior art.
Figure 18:
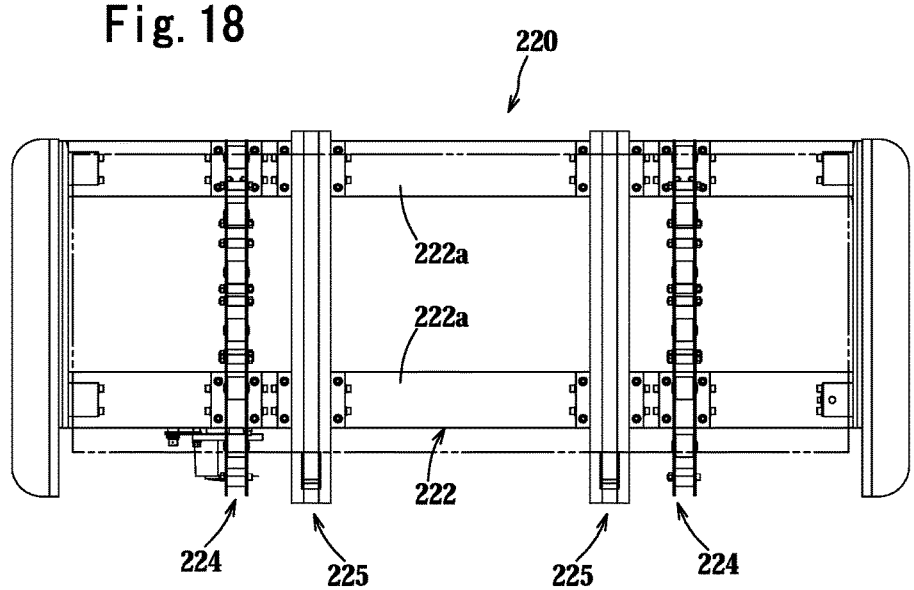
FIG. 18 is a plan view of a mold conveyance trolley thereof.
Figure 19:
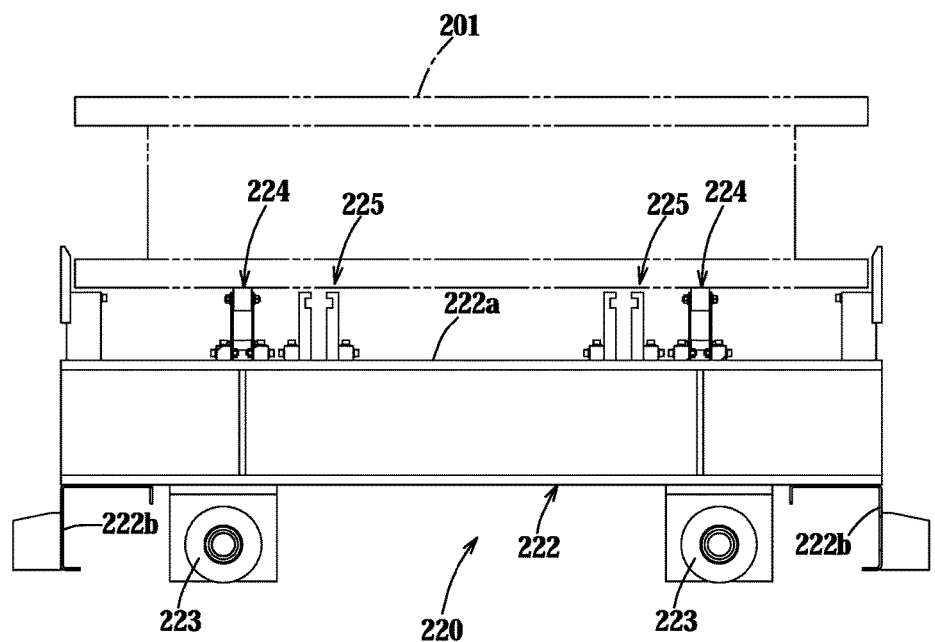
FIG. 19 is an elevation view of the mold conveyance trolley.

As shown in FIGS. 7 and 13, the pusher device 80 comprises a chain case 81 that is installed in front of the mold conveyance trolley 60, a pair of sprockets 82 provided at upper edge portions of the front edge portion of the chain case 81 in positions that correspond to the guide rails 71, 72, two chains 83 that extend from within the chain case 81 and are engaged over the pair of sprockets 82, a pair of pusher carriages 84 that are linked to the rear end portions of these two chains 83, a pair of pusher heads 85 that are respectively coupled to the upper parts of the pair of pusher carriages 84 by pins, and a drive motor 86 that rotationally drives the pair of sprockets 82.

The pusher carriage 84 is capable of shifting along the T grooves of the abovementioned guide rails 56, 57, 71, 72. The chain 83 has a plurality of link connecting pints and small diameter free wheels at both end portions of the link connecting pins, and these free wheels on both its sides are engaged into the horizontal groove portions of the abovementioned T grooves.

With the above structure, due to the sprockets 82 being rotated by the drive motor 86, it is possible for the pusher carriages 84 to be pushed and pulled back and forth in the front and rear direction along the guide rails 56, 57, 71, 72. Rectangular apertures are formed in the tip end portions of the pusher heads 85. Pusher connection lugs 87 are attached to a front edge portion of the die 42, and, when the rectangular apertures of the pusher heads 85 are engaged with the pusher connection lugs 87, the die 82 can be pushed or pulled by the chains 83 and the pusher carriages 84.

The operation and the advantageous effects of the mold conveyance trolley 60 explained above are fundamentally the same as the operation and the advantageous effects of the mold conveyance trolley 20, previously described. Due to the provision of the first and second structural frames 67, 68, it is possible to lighten the trolley body 61 of the mold conveyance trolley 60, to simplify the construction for connecting the plurality of roller support plates 69*a*, 70*a* to the trolley body 61, and to reduce the cost of production of the mold conveyance trolley 60.

Due to the application of tension to the three linking members 75*a*, 75*b*, 75*c* of the first and second structural frames 67, 68, along with it being possible to enhance the strength and the rigidity of the linking between the linking members 75 and the steel pipe members 76, the first and second side plates 65, 66, the two pairs of roller support plates 69*a*, 70*a*, and the pair of guide rails 56, 57, also it is possible to enhance the rigidity of the front portion and the rigidity of the rear portion of the trolley body 61 in a vertical plane.

Next, examples in which the above embodiments are partially modified will be explained.

(1) The number of linking members of the first and second structural frames arranged in the vertical direction is not to be considered as being limited to three; it would also be acceptable to provide two linking members arranged in the vertical direction, or four or more.

Furthermore, as the linking members of the first and second structural frames, it would also be possible to provide, not a plurality of linking members arranged in a single column in the vertical direction, but rather a plurality of linking members arranged in a plurality of columns.

(2) While the linking members described above are made from small diameter steel pipe, it would also be acceptable to make them from solid rod material, or as tension members made from steel cable or high strength synthetic resin fibers to which tension can be applied, or as tension members made from fiber reinforced synthetic resin.

(3) Although it is preferred to make the plurality of linking members as members of the same type and the same size, it would also be possible to employ a plurality of linking members that are of different types, or a plurality of linking members that are of different sizes. The same considerations apply to the steel pipe members.

(4) Apart from the above, it would be possible for a person skilled in the art, without deviating from the gist of the present invention, to implement various changes to the embodiments described above, and the present invention is to be considered as also including such variant form of implementation.

INDUSTRIAL APPLICABILITY

The present invention provides a mold conveyance trolley for an injection molding machine, a mold conveyance trolley for a press machine, and a mold conveyance trolley for other applications.

DESCRIPTION OF REFERENCE NUMERALS

3: mold
20, 60: mold conveyance trolley
21, 22: first and second roller conveyor
23, 61: trolley body
24, 25, 62, 63: wheel
24a, 25a: wheel support member
26, 65: first side plate
27, 66: second side plate
28, 29: first and second structural frame
67, 68: first and second structural frame
30: horizontal base plate
31, 32: plate member
35, 75: linking member
36, 76: steel pipe member
33, 34: coupling block
37: roller member
42: mold
62a, 63a: wheel support member
70b: second roller member
69a, 70a: roller support plate
73, 74: coupling block
69, 70: third roller conveyor

The invention claimed is:

1. A mold conveyance trolley comprising a trolley body and two pairs of wheels provided at the lower portion of the trolley body, and capable of propelling itself in a first direction via the two pairs of wheels and of conveying a mold, wherein:
the trolley body comprises, at both its side portions, first and second side plates disposed in vertical attitudes and oriented in a front and rear direction orthogonal to the first direction, first and second structural frames that are capable of providing rigidity in vertical planes to a front portion and a rear portion of the trolley body; and a plurality of plate members disposed in vertical attitudes and oriented in the front and rear direction, with intersecting the first and second structural frames; and wherein
each of the first and second structural frames comprises a plurality of linking members that are provided parallel to the first direction and disposed at different height positions and linked to the first and second side plates, and a plurality of steel pipe members that are fitted over each of the plurality of linking members and have a spacer function of regulating the gaps between the plurality of plate members through which the linking members penetrate, and gaps between the plate members and the first and second side plates.

2. The mold conveyance trolley according to claim 1, wherein the plurality of plate members are a plurality of roller support plates that support a plurality of roller members for mold transfer.

3. The mold conveyance trolley according to claim 2, wherein there are provided a horizontal base plate that connects a lower edge portions of the first and second side plates, two pairs of wheel support members to each of which a pair of front and rear wheels are installed and that are fixed to a lower surface of the horizontal base plate, and a plurality of coupling blocks that are set up on the horizontal base plate above the two pairs of wheel support members; and each of the first and second side plates is connected to the coupling blocks via the linking members and the steel pipe members, and the lower edge portions of the plurality of roller support plates are fixed to the horizontal base plate.

4. The mold conveyance trolley according to claim 3, wherein
the first side plate, a roller support plate that opposes the first side plate with a predetermined gap therebetween, and a plurality of first roller members having lengths corresponding to the predetermined gap are constituting a first roller conveyor that is capable of transferring a mold for injection molding in the front and rear direction; and
the second side plate, a roller support plate that opposes the second side plate with a predetermined gap therebetween, and a plurality of first roller members are constituting a second roller conveyor that is capable of transferring the mold for injection molding in the front and rear direction.

5. The mold conveyance trolley according to claim 2, wherein there are provided two pairs of wheel support members between the first and second side plates, to each of which a pair of front and rear wheels are installed, and a plurality of coupling blocks that are fixed above the two pairs of wheel support members; and wherein
the plurality of roller support plates comprise two pairs of roller support plates disposed in states to sandwich the coupling blocks; and
each of the two pairs of roller support plates is linked to the coupling block via the linking member and a plurality of steel pipe members.

6. The mold conveyance trolley according to claim 5, wherein transfer of a mold for a press machine is enabled by two third roller conveyors, each of which comprises a plurality of second roller members fitted to the upper edge portions of a pair of roller support plates.

7. The mold conveyance trolley according to claim 1, wherein each of the plurality of linking members is kept in a state in which tension is applied thereto.

* * * * *